United States Patent [19]

Achterholt

[11] Patent Number: 4,819,686

[45] Date of Patent: Apr. 11, 1989

[54] PRESSURE DROP INDICATING VALVE CAP FOR PNEUMATIC TIRES

[76] Inventor: Rainer Achterholt, Paul-Zoll-Str. 3, D-8963 Waltenhofen 1, Fed. Rep. of Germany

[21] Appl. No.: 71,581

[22] Filed: Jul. 9, 1987

Related U.S. Application Data

[63] Continuation of Ser. No. 945,566, Dec. 23, 1986, abandoned.

[30] Foreign Application Priority Data

Dec. 30, 1985 [DE] Fed. Rep. of Germany ....... 3546338

[51] Int. Cl.$^4$ .................... F16K 15/20; F16K 37/00
[52] U.S. Cl. .................................. 137/229; 137/227; 137/233; 116/34 R; 73/146.8
[58] Field of Search ............ 137/227, 232, 557, 233, 137/229; 73/146.3, 146.8; 116/34 R

[56] References Cited

U.S. PATENT DOCUMENTS

| | | | |
|---|---|---|---|
| 2,697,999 | 12/1954 | Crookston et al. | 73/146.3 X |
| 2,704,045 | 3/1955 | Riesing | 116/34 R |
| 2,866,432 | 12/1958 | Laurie, Jr. | 116/34 R |
| 3,111,930 | 11/1963 | Zipper | 116/34 R |
| 3,241,514 | 3/1966 | Grimland | 116/34 R |
| 3,792,677 | 2/1974 | Frost | 137/227 X |
| 4,082,056 | 4/1978 | German | 116/34 R |
| 4,103,549 | 8/1978 | Schmidt | 73/146.8 |
| 4,606,391 | 8/1986 | Achterholt | 137/227 X |

*Primary Examiner*—John Rivell
*Attorney, Agent, or Firm*—Leydig, Voit & Mayer

[57] ABSTRACT

A valve cap adapted to be screwed onto the valve of a pneumatic tire gives a pressure drop indication. To this end the valve cap comprises a deflectable diaphragm which separates the housing interior into a first chamber adjacent a transparent section of the closed housing end portion and a second chamber which is in communication with the tire interior through a port formed in a transverse housing wall and through the open tire valve. When the valve cap has been tightly screwed onto the tire valve and the tire valve has been opened, the desired tire pressure will be built up in both chambers. Upon closing of the second chamber a reference pressure corresponding to the desired tire pressure will prevail therein. Any reduction of the tire pressure relative to the reference pressure will cause the diaphragm to converge towards the transparent housing portion, thus serving as an indication.

20 Claims, 5 Drawing Sheets

PRESSURE DROP INDICATING VALVE CAP FOR PNEUMATIC TIRES

This application is a continuation of application Ser. No. 945,566, filed Dec. 23, 1986, now abandoned.

The invention is directed to a valve cap for pneumatic tires capable of indicating by purely mechanical means a drop in the tire pressure. The preferred use of the valve cap is with passenger-car tires which are operated at a desired tire pressure of about 1.4 bar to 3.0 bar. Modified configurations are possible for use with bicycle tires, motorcycle tires and truck tires.

In particular, the invention is directed to a pressure drop indicating valve cap for a pneumatic tire equipped with a valve. The valve cap includes a unilaterally closed housing adapted to be screwed onto a valve tube of the tire valve, a sealing element for sealing the valve tube relative to the open housing end portion of the screwed-home valve cap, an actuator for opening the tire valve, and a deflectable diaphragm used as an indicator. The diaphragm separates the housing interior into a first chamber adjacent a transparent section of the closed housing end portion and a second chamber which is in communication with the tire interior through a port formed in a housing wall and through the open tire valve.

DE-OS No. 3,104,081 discloses a valve cap in which, the tire pressure inflates the diaphragm into the closed first chamber to form a balloon. The diaphragm is continually held in the inflated or expanded state. For the indication of pressure the transparent housing portion may be provided with a pressure graduation so that the tire pressure may be read out from the position of the peak of the deflected diaphragm relative to the graduation. Alternatively, a pattern may be provided on the diaphragm surface which is deformed by inflation of the diaphragm in such a way that the tire pressure may be read out and checked on the basis of the deformation of the pattern. In each case a drop in the tire pressure will result in a corresponding contraction of the inflated balloon, while the peak of the diaphragm will move away from the transparent housing end portion.

Although it has been known for several years, this valve cap evidently has not been implemented commercially. This may be due to the fact that the accuracy of pressure drop indication and the readability of such a indication have been unsatisfactory.

A valve cap permanently indicating the air pressure and operating along the same principle has also been known from the DE-OS No. 2,518,859. Here, too, the tire pressure is permanently applied to a movable diaphragm or plunger, and this movement within a closed cap of transparent material - possibly relative to fixed marks - is used as an indication of actual tire pressure.

Basically, valve caps of this type are small lightweight devices. The weight must not exceed 1 or 2 g so that no significant tire imbalance will be caused. According to DIN 7757 the internal thread of commonly used valve caps (Vg 8) has a diameter of 8 mm. Hence, there results a diameter of about 6 to 9 mm for the deflectable diaphragm. With the known valve cap such a small diaphragm is continually exposed to the tire pressure, which for most tires of passenger cars amounts to about 1.8 to 2.4 bar. This tire pressure is meant to inflate the diaphragm to a balloon of defined size which is capable of resisting the continual variations and fluctuations of the pressure during normal use of the tire and which should nevertheless react to a tire pressure drop of 0.32 bar by a clearly visible contraction. In practical use, the continual exposure of the diaphragm to a tire pressure in the normal range of 1.4 to 3 bar, on the one hand, and a clearly visible variation of the contraction of the balloon for a tire pressure drop of 0.3 bar cannot be combined satisfactorily.

Moreover, there is the further difficulty that during normal use of a tire a pressure increase of up to about 0.3 bar may well occur due to an increase in temperature such as caused by variations of ambient temperature or fast running motion. A pressure drop indicating valve cap for pneumatic tires should not indicate these pressure variations occurring during normal use, on the one hand, and should clearly indicate a reduction in the tire pressure of at least 0.3 bar relative to the desired tire pressure, on the other hand. These are quite stringent requirements for a small system which operates purely mechanically and which must be fabricated at little expense in considerable numbers.

It is the object of the present invention to provide a valve cap which may be used as a single embodiment for any normal tire pressure in the range from at least 1.4 bar to 3.0 bar and which in any case gives a clearly visible and easily readable indication when the tire pressure drops by 0.3 bar or more relative to a desired value.

In accordance with a further objective of the invention the pressure drop indication given by the valve cap is not affected by those pressure variations which occur during normal operation and loading of a tire, for instance a passenger-car tire, during fast driving on a motorway.

According to a further objective of the invention said valve cap is of simple structure and can be fabricated economically.

In accordance with the present invention, a valve cap is provided in which a port formed in a housing wall is adapted to be hermetically sealed by a sealing member, in which at least one permanently open passageway is provided between a first chamber and the open tire valve and is recessed from the housing material, and in which, with the tire pressure, being reduced relative to the initial pressure the diaphragm takes a position closer to the transparent housing portion.

In accordance with another aspect of the invention, a hermetically sealable space is provided within the valve cap in which the desired tire pressure exists as a reference pressure. The diaphragm is continually exposed to said reference pressure, on the one hand, and to the actual tire pressure, on the other hand. Since the difference between these two pressures is small, any considerable mechanical loading of the diaphragm is avoided. The diaphragm may be fabricated from comparatively easily expandable material so that a relatively small pressure variation of but a few tenths of a bar will already cause considerable deflection of the diaphragm. Especially when the diaphragm has a signal or contrasting colour relative to its environment, the convergence of such a diaphragm towards an aperture provided in a sight screen can be readily recognized. Even with a small pressure drop this combination of features will result in a clearly visible and easily readable indication. By a corresponding choice of material and dimensions of the diaphragm, the sensitivity thereof may be adjusted within a wide range. It is readily possible to achieve a clearly visible diaphragm deflection of about 2 to 3 mm for a tire pressure drop of but 0.1 to 0.2 bar.

This high accuracy of response is not affected by the pressure variations occurring upon normal loading and use of a tire, because these pressure variations do not change the reference pressure inside the closed space. Upon loading and use of a tire, pressure increases relative to the desired tire pressure normally occur; such pressure increases cause deflection of the diaphragm away from the sight screen so that it cannot be observed by the user.

As will be explained below in detail, the valve cap according to the invention comprises only a few parts. The valve cap housing may be fabricated from commonly used synthetic materials which permit injection moulding. Alternatively, at least the portion which is screwed home on the tire valve may consist of metal such as brass or Zamak (i.e., a die-casting zinc alloy). The assembly thereof merely requires screw connections or welds, whereby simple structure and economic manufacture are ensured. Automated series production with high piece numbers is possible.

Advantageous embodiments and further improvements of the valve cap may also be provided according to the invention.

When the valve cap is screwed home on the valve tube, the sealing element is preferably compressible by at least 1.5 mm. To this end the sealing element, which is fabricated from a sufficiently flexible material, may be inserted in an annular cut-out of larger cross-sectional dimensions than the cross-section of the sealing element, so that there is sufficient room for a deformation of the sealing element.

Various embodiments may be provided for the sealing member for closing the port formed in the housing wall. It is required that, when the desired tire pressure has been set in the first and in the second chamber, said sealing member permanently seals the second chamber so that a reference pressure which corresponds to the desired tire pressure is provided in the second chamber.

For instance, the sealing member may be a shut-off member which is urged by a section of the tire valve tube end face against the port formed in the housing wall to thereby permanently close said port. Alternatively, such a shut-off member may also be supported by a different section of the tire valve, for instance by the bridge member guiding the tire valve plunger. A particularly good and permanent sealed state is achieved when the port formed in the housing wall is provided with a valve seat profile and a valve body section is integrally formed with said shut-off valve, said valve body section being matched to said valve seat profile.

When the sealing element in the preferred configuration can be compressed by at least c.1.5 mm when the valve cap is screwed home on the tire valve tube, three-stage sealing can be achieved for this embodiment. In accordance with relevant standards (see for instance DIN 7757) there may be a tolerance of about 0.9 mm between the end face of the tire valve plunger and the end face of the tire valve tube. Even in case of such a tolerance the specified compressibility of at least about 1.5 mm enables the provision of a hermetic seal in the first stage between valve tube and the open housing end portion of the valve cap when the valve cap is screwed home on the valve tube prior to actuation of the tire valve plunger. Any escape of pressurized gas from the tire to the environment is thereby prevented. Thus the valve cap according to the invention is also suitable for tires which instead of pressurized air contain a different, much more expensive gas.

In a second stage of screwing the valve cap home on the tire valve tube, the actuator opens the tire valve. In most cases the actuator is a projection or pin which is fixedly joined to the valve cap housing and abuts the tire valve plunger and depresses the same upon further screwing home of the valve cap on the tire valve tube.

Through the now open tire valve the pressure medium will flow via the port formed in the housing wall into the second chamber and via at least one passageway recessed in the housing material into the first chamber until the tire pressure is likewise provided in both said chambers. By a corresponding configuration of the respective fluid flow paths it is possible to prevent any one-sided and/or abrupt load on the diaphragm. Even after exposure of the diaphragm to the tire pressure the diaphragm is not subjected to any special or additional mechanical load, because the same tire pressure prevails on either side of the diaphragm.

In a third stage of screwing the valve cap home on the tire valve tube, the sealing member is now urged by a section of the end face of the tire valve tube or by another valve section against the housing wall where it hermetically seals the port extending through said housing wall. Thereby a reference pressure corresponding to the desired tire pressure is permanently set in the second chamber.

As will be more clearly apparent from the following detailed description of preferred embodiments, the diaphragm defines said chamber to which the reference pressure is applied.

The actual tire pressure exists on the other side of the diaphragm inside the first chamber. Upon a drop in the actual tire pressure the reference pressure will cause a deflection of the diaphragm towards the sight screen, which serves as an indication of a drop in the actual tire pressure relative to the desired tire pressure.

According to a further advantageous embodiment of the invention the sealing member may be a resiliently retained shut-off member which is urged by a spring element against the housing wall to thereby permanently close the pressure balancing port leading into the second chamber. For example, said port may be formed in a housing wall section which defines the second chamber and is parallel to the sidewall of the valve cap housing. The spring element used may be a leaf spring which is oriented substantially in parallel to said housing wall section and beneath the protrusion of which the shut-off member is urged towards the port to hermetically seal the same. Various measures may be provided for deflecting said leaf spring against its inherent bias either when the valve cap is screwed home on the tire valve or subsequent thereto, wherein the shut-off member is separated from the port and a pressure balance between the second and the first chamber or the open tire valve may take place, respectively. Said leaf spring may be fabricated, for example, from spring steel strip, as a Belleville spring washer, as a disk-like leaf spring or the like.

It is especially suitable to provide magnetic action for such deflection of the leaf spring. To this end the leaf spring may be fabricated from spring steel or another material capable of being attracted magnetically, and in a wrench used for screwing the valve cap onto the tire valve there is provided a permanent magnet which deflects the leaf spring against the protrusion thereof to such an extent that the shut-off member retained by the leaf spring is lifted off its valve seat on the pressure balancing port to the second chamber. Alternatively, the leaf spring may be fabricated from permanent magnetic material or it may be provided with an additional small permanent magnet, and by the proximity of iron material or permanent magnetic material of opposite polarity the leaf spring may be deflected accordingly so as to perform the initial pressure balance.

In accordance with a still further advantageous embodiment of the invention the sealing member may be a flap valve which is biased towards the second chamber. The biasing element may be a spring, a plunger of flexible material or the like. The bias of said biasing element must be sufficiently large to resist any increases in tire pressure due to temperature variations and/or strain and use. On the other hand, said bias must not be sufficient to result in a significant deviation of the reference pressure in the second chamber from the desired tire pressure. When the actuator has depressed the tire valve plunger, the significantly higher tire pressure will in any case overcome the biasing force of the flap valve so that the pressure in the second chamber will increase. A slow-action or delay-action biasing element ensures a matching of the reference pressure in the second chamber with the desired tire pressure.

Instead of such a compressible shut-off member or a unilaterally biased flap valve it is also possible to provide other common valve assemblies which permit fluid flow only in one direction, for example ball check valves.

With the afore-described embodiment of the valve cap of the invention, screwing home of the valve cap on the tire valve tube initially causes mutual sealing and subsequent opening of the tire valve. These two functions can also be provided separately. A corresponding alternative embodiment of the valve cap includes a screw portion adapted to be screwed on the tire valve tube and an indicator portion which is movable relative to said screw portion. After hermetic sealing between tire valve tube and screw portion has been effected, further changing of the indicator portion will depress the tire valve plunger and open the tire valve. To this end, protrusions on the indicator portion may engage in guide means on the periphery of the screw portion, said guide means leading helically towards the open end of the screw portion and terminating in a bayonet fixing. Preferably, the alternative configuration is provided in which protrusions on the screw portion engage in helical guide means on the inside of a cylindrical skirt on the indicator portion, as will be explained in detail below with reference to FIG. 3. First the screw portion, which is preferably provided with a corresponding, axially oriented knurling, is tightly screwed onto the tire valve tube until the sealing element offers a corresponding resistance which ensures reliable sealing. Then, the indicator portion is moved relative to the fixed screw portion, said movement being connected with a movement towards the tire valve. During this movement towards the tire valve the actuator, which is fixedly joined to the indicator portion, depresses the tire valve plunger and opens the tire valve. Sealing means on the sliding faces between screw portion and indicator portion ensure relative movability, on the one hand, and hermetic sealing between said two components, on the other hand. This embodiment is highly reliable to ensure that the valve cap is first hermetically sealed relative to the tire valve and only then the tire valve is opened. Any loss of valuable pressure medium in the tire interior is reliably prevented.

The sealing member of this special valve cap composed of screw portion and relatively movable indicator portion may comprise a compressible shut-off member or a flap valve biased towards the second chamber, as already explained above, or it may comprise another commonly used valve assembly which permits fluid flow only in one direction.

The deflectable diaphragm of the valve cap according to the invention is preferably a disk diaphragm with a peripheral rim which is fixed in a recess on the inner periphery of the valve cap housing. Useful diaphragm materials are natural rubber, various rubber types and plasticized synthetic materials. A relatively large deflection by exposure to a small force is desirable for the diaphragm. Preferably, each tire pressure drop by 0.1 bar should result in an approximately linear deflection of the diaphragm by about 1 to 2 mm. The valve cap according to the invention should at least indicate a pressure drop by 0.3 bar in a clearly visible and easily readable way. Such a pressure drop will cause deflection of the diaphragm by at least 2 to 3 mm from its inoperative position. According to the invention various measures are provided to improve the recognizability of such a diaphragm deflection.

The transparent closed end of the valve cap housing is covered with an opaque material which merely permits observation through a defined aperture. The diameter of the preferably circular aperture is preferably 2 to 4 mm;

In its inoperative position the diaphragm has a spacing of about 1.5 to 4.0 mm from said transparent housing portion.

The material of the diaphragm is preferably coloured and has a signal or contrasting colour relative to its environment, especially relative to the material of the sight screen.

When these conditions are observed, even a diaphragm movement of only 1 to 2 mm is extremely well visible so that a clearly visible and easily readable indication is provided.

For example, a red-coloured diaphragm may be disposed inside a black housing which is provided with a transparent aperture having a diameter of 3 mm. In the inoperative position the diaphragm has a spacing of 2 mm from said aperture and is not visible in the dark space confined by black housing material. Upon deflection of the diaphragm by 1 to 2 mm a red spot will become visible within the aperture, which spot is also visible from some distance, for instance from a bent position, as a pressure drop indication.

Below, the preferred embodiments of the invention will be explained in detail with reference to the drawings, in which.

Figure 1:
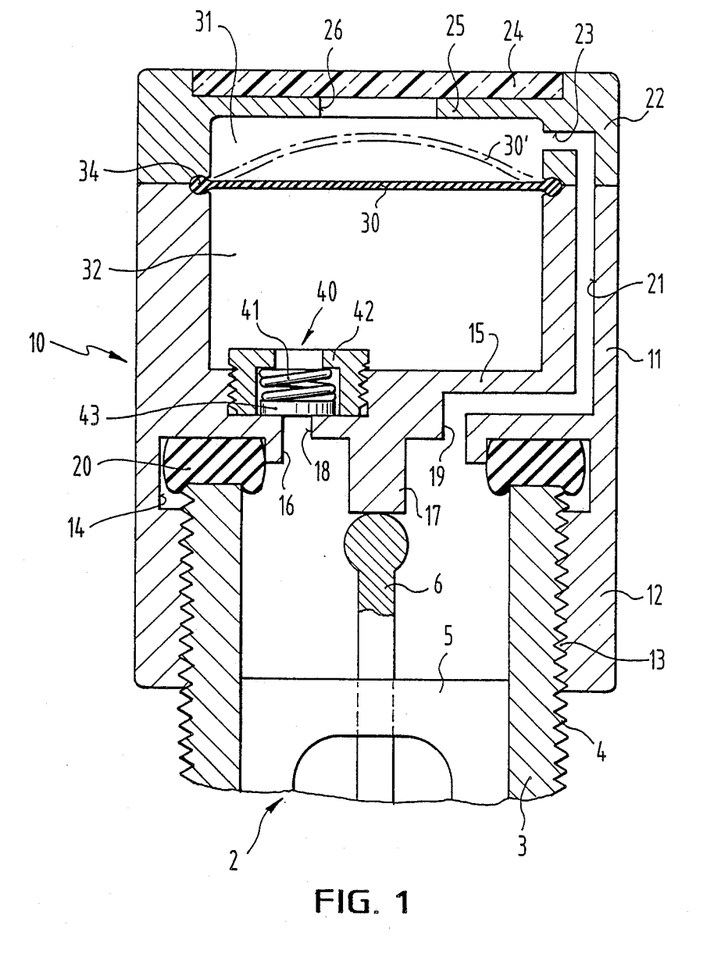
FIG. 1 is a schematic view of a first embodiment of a valve cap according to the invention, the sealing member of which is configured as a unilaterally biased flap valve.

FIG. 1 illustrates a valve cap 10 which is screwed home on the valve tube 3 of a conventional tire valve 2. Inside of the valve tube 3, which is formed with an external thread 4, there is provided a support or bridge 5 for supporting the valve rod 6 which is movably held under the biasing force of a spring (not illustrated).

The valve cap 10 generally comprises the valve cap housing 11, the sealing element 20, the diaphragm 30 and the sealing member 40. The housing 11 has an open end portion 12 and a closed end portion 22. The open housing end portion 12 is formed with an internal thread 13 matching the external thread 4 of conventional tire valves 2. A transverse housing wall 15 extends approximately centrally and transversely to the axial direction, and a continuous land 16 and the plunger-like actuator 17 project from said transverse wall towards the open housing end 12. Adjacent the transverse housing wall 15, material has been removed from the housing inner wall to result in a recess 14 for accommodating the sealing element 20. The sealing element 20 may, for instance, be an O-ring or a quadrilateral ring of compressible material having a thickness of from 2 to 4 mm, which is held in engagement with the land 16. The cross-sectional dimensions of the recess 14 are larger than the cross-section of the sealing element 20 so that there is sufficient space for elastic deformation of the sealing element 20.

A port 18 and at least one inlet 19 extend through the transverse housing wall 15, the inlet 19 leading to at least one passageway recessed from the housing material.

In the illustrated embodiment the valve cap housing 11 essentially comprises of a sleeve which is provided with a centrally located transverse wall 15. Preferably the sleeve is an injection moulded part of synthetic material. A transparent cover plate 24 is hermetically inserted into the closed housing end portion 22. An opaque panel 25 abuts the inside of the cover plate 24 in such a way that merely a circular aperture 26 is left open. In the illustrated embodiment, said aperture 26 has a diameter of about 3 mm.

The peripheral rim 34 of a diaphragm 30 is inserted in a continuous recess in the inner wall of the closed housing part 22. This diaphragm 30 separates the housing interior into a first chamber 31 adjacent the closed housing part 22 including the transparent portion 24 and a second chamber 32 which communicates with the tire interior via the port 18 in the transverse housing wall 15 and via the open tire valve 2. The passageway 21 opens into the first chamber 31 via the outlet 23, so that with a tire valve in the open position there is permanent fluid communication between the tire interior and the first chamber 31.

The sealing member 40 is inserted in the port 18 or, respectively, the fluid flow path leading from the open housing end 12 to the second chamber 32. In the illustrated embodiment, the sealing member 40 is a flap valve which is urged towards the second chamber 32. As will be apparent, the entire flap valve may be threaded into an opening in the transverse housing wall 15. The biasing means used is a schematically indicated coil spring 41 which abuts a continuous lug 42, on the one hand, and the top of the flap 43, on the other hand. The unilaterally biased flap valve permits passage of fluid medium from the open housing end 12 into the second chamber 32 so that upon opening of the tire valve 2 the reference pressure can be adjusted within the second chamber 32, said reference pressure corresponding to the predetermined tire pressure used as desired tire pressure. Upon a drop in the tire pressure the flap valve 43 remains closed under the action of the spring 41 so that a return flow of pressurized medium is prevented. Due to the reference pressure within the second chamber 32 remaining constant, whereas the actual tire pressure and the corresponding pressure in the first chamber 31 may possibly decrease, the resulting pressure difference causes deflection of the diaphragm 30 towards the panel aperture 26, which is schematically indicated by the dashed-line diaphragm 30'. The deflected diaphragm 30', which is preferably coloured red, will now become visible through the aperture 26 in the transparent cover plate 24, thus indicating a pressure drop.

In the embodiment illustrated in FIG. 1 the valve cap 10 is fully screwed home on the valve tube of the tire valve 2 so that the sealing member 20 is considerably compressed and the actuator 17 depresses the tire valve rod 6 to such an extent that the pressure in the tire interior is applied to both the first chamber 31 and the second chamber 32.

Figure 2:
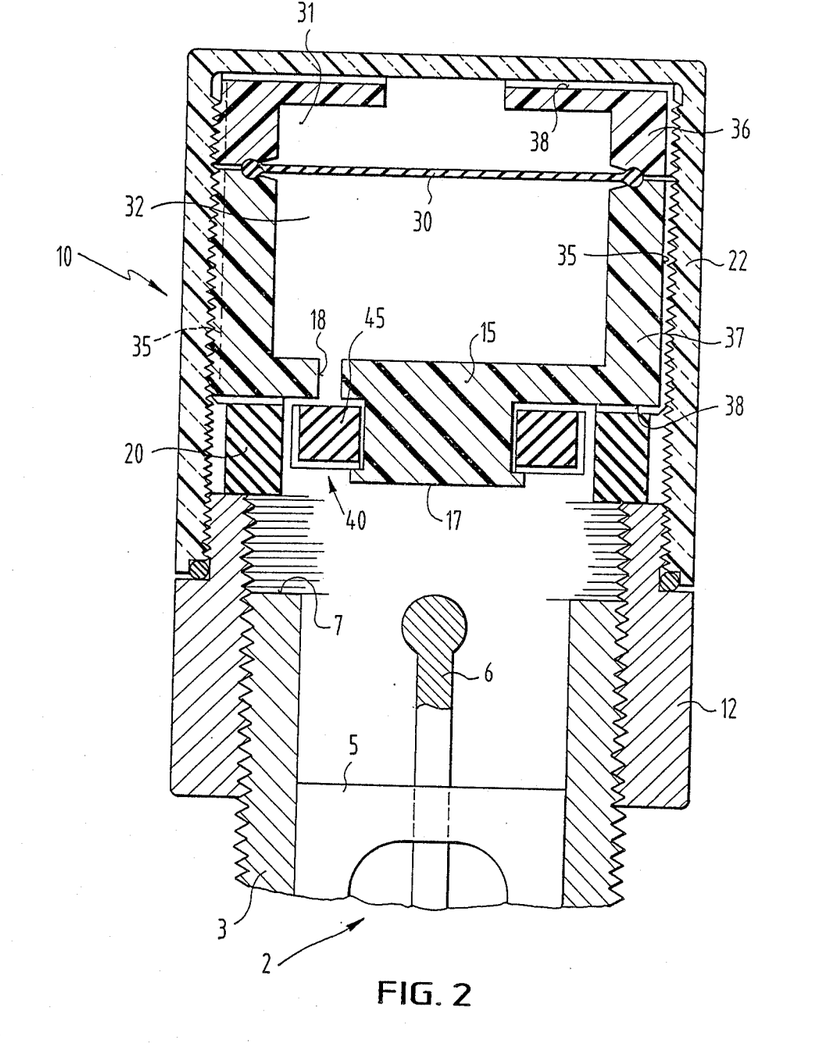
FIG. 2 is a schematic view of a second embodiment of a valve cap according to the invention, the sealing member of which is configured as a compressible valve body.

FIG. 2 shows a similarly designed valve cap 10 which is only partly screwed down on a tire valve 2. The end wall 7 of the tire valve tube 3 is not yet in engagement with the sealing element 20. The tire valve rod 6 is held in the closed position by a valve spring (not illustrated). The sealing member 40, which differs from the embodiment described above with reference to FIG. 1, is a shut-off member 45 adapted to be urged against the port 18 in the transverse housing wall 15 for blocking said port 18 when the reference pressure has been built up in the second chamber 32.

In this embodiment, the housing comprises of the sleeve-like open housing end portion 12 and a closed housing end portion 22 of transparent synthetic material adapted to be screwed down on the sleeve-like housing end portion 12. Two inserts 36 and 37 are threaded into the closed transparent housing end portion 22 for defining the first chamber 31 and the second chamber 32. Again, a deflectable diaphragm 30 separates said two chambers from each other. Schematically indicated, axially extending recessed portions 35 on the outer circumference of the inserts 36 and 37 and further passageways 38 provide for a permanently open fluid communication from the interior of the open housing end portion 12 to the first chamber 31.

Due to the respective dimensions and the mutual arrangement of sealing member 20, actuator 17 and shut-off member 45 this embodiment enables three-stage sealing when the valve cap 10 is screwed home on the tire valve 2. Starting from the position illustrated in FIG. 2, the end face 7 of the tire valve tube 3 will contact and compress the sealing element 20 upon further tightening. Since the end face of the actuator 17 is recessed relative to the sealing face of the sealing element 20, the actuator 17 will contact the tire valve rod 6 only after sufficient compression of the sealing element ensuring hermetic sealing. Only then will the actuator 17 depress the tire valve rod 6 upon further tightening of the valve cap to thereby open the tire valve. Upon opening of the tire valve 2 the tire pressure passes through the port 18, which is open at that time, into the second chamber 32 and via corresponding fluid communication means 35, 38 into the first chamber 31. Thereby the reference pressure can be provided in the second chamber 32.

Upon still further tightening of the valve cap, a portion of the end face 7 of the tire valve tube 3 will finally contact the shut-off member 45 to move the same into abutment on the transverse housing wall 15 so as to block the port 18. Alternatively, the shut-off member 45 could be supported by the bridge 5 which guides the valve rod 6.

For reasons of clarity, the dimensional differences between sealing element 20, actuator 17 and shut-off member 45 have been exaggerated in FIG. 2. In practical use a distance of about 1.5 to 2.5 mm will be quite sufficient to cause hermetic sealing between valve cap 10 and tire valve 2, to open the tire valve 2 and to close the port 18 by means of the shut-off member 45.

Figure 3A:
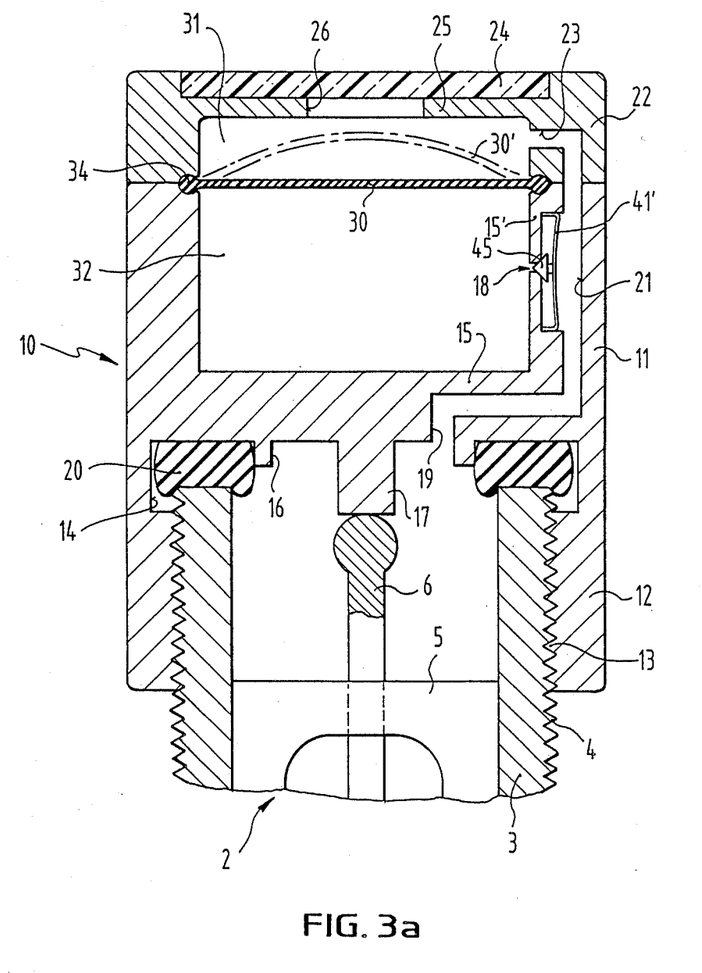
FIGS. 3a and 3b are schematic views of a third embodiment of a valve cap according to the invention, the sealing member of which is a shut-off member held by a leaf spring which under magnetic action can be deflected in opposition to its inherent bias.

FIG. 3a illustrates a further embodiment of a valve cap according to the invention which largely corresponds to the valve cap described with reference to FIG. 1; however, a different valve assembly is provided in this case. In the embodiment of FIG. 3a the transverse housing wall 15 is closed and the pressure relief port 18 for the second chamber 32 is provided in a housing wall portion 15' which defines the second chamber 32 and is oriented essentially parallel to the sidewall of the valve cap housing 11. This port 18 is in fluid communication with the passageway 21, which cannot be closed, so that the pressure prevailing in the tire interior can be communicated via the open tire valve 2, the passageway 21 and the port 18 to the second chamber 32 unless the port 18 is closed.

The port 18 has a conical valve seat configuration formed thereon for abutment of a mating shut-off member 45. This shut-off member 45 is provided on a leaf spring 41' which is oriented essentially parallel to the housing wall portion 15' and has its ends secured thereto. The design and arrangement of shut-off member 45 and leaf spring 41' are chosen in such a way that the biasing force of the leaf spring 41' urges the shut-off member 45 against its valve seat to close the port 18. It is possible, for instance, to select a valve assembly with shut-off member 45 and additional sealing material on the valve seat configuration inside the port 18 of the type implemented in conventional disposable lighters filled with liquid gas. Such a valve assembly provides for a permanent hermetic arrangement by very simple means within a limited space.

In order to apply the desired tire pressure prevailing in the tire interior to the second chamber 32 either when the valve cap 10 is screwed home on the tire valve 2 or subsequent to this operation, the leaf spring 41 must be deflected—against its inherent bias—from its normal position so as to release the shut-off member 45 from its valve seat on the port 18. Preferably, magnetic action on the leaf spring 41' is provided for such deflection, because such a magnetic action is possible through the closed valve housing 11. To this end the leaf spring 41' may be fabricated from spring steel or another material capable of being attracted magnetically, and a permanent magnet is provided in a wrench—not illustrated—used to screw the valve cap 10 onto the tire valve 2, said permanent magnet deflecting the leaf spring 41' against the projection thereof to such an extent that the shut-off member 45 held by the leaf spring 41' is lifted off its valve seat on the pressure balancing port 18 to the second chamber 32. Alternatively, the leaf spring 41' may be fabricated from permanent magnetic material or may be provided with an additional small permanent magnet—not illustrated—and by the proximity of iron material or of permanent magnetic material of opposite polarity the leaf spring 41' can be deflected correspondingly in order to perform the initial balancing of pressure. In any case a temporary magnetic action is provided which is sufficient for applying the desired tire pressure to the second chamber 32. After termination of the magnetic action the leaf spring 41' will return to its normal position to urge the shut-off member 45 into its valve seat on the port 18, whereby the second chamber is hermetically sealed. Subsequently, the reference pressure corresponding to the desired tire pressure will permanently exist in the second chamber 32.

Figure 3B:
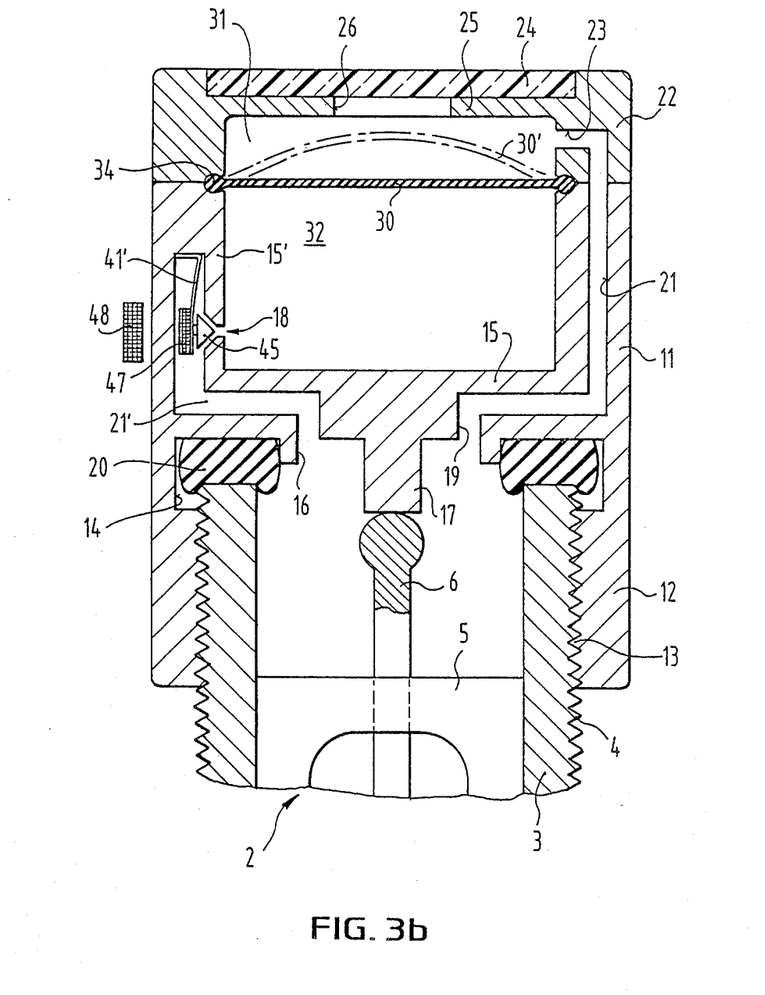

FIG. 3b illustrates a modification of the valve cap according to the invention as shown in FIG. 3a. In this case the leaf spring 41' including the shut-off member 45 is not disposed in the vicinity of the passageway 21 but an additional passageway 21' is provided for communicating the pressure balancing port 18 to the interior of the tire valve 2. The leaf spring 41' is a cantilever spring. The free leaf spring end has provided on one side thereof, adjacent the port 18, the shut-off member 45 while a small disk-shaped permanent magnet 47, for instance a commercially available measuring magnet fabricated from a high-coercivity magnetic material is attached to the other side. In the normal position, the biasing force of the leaf spring 41' urges the shut-off member 45 into the matching conical valve seat on the port 18 and seals the same hermetically. By the proximity of soft-iron material 48 or the like it is possible to deflect the leaf spring against its inherent bias from the normal position and the shut-off member 45 may be lifted off its valve seat, as illustrated schematically in FIG. 3b.

Figure 4:
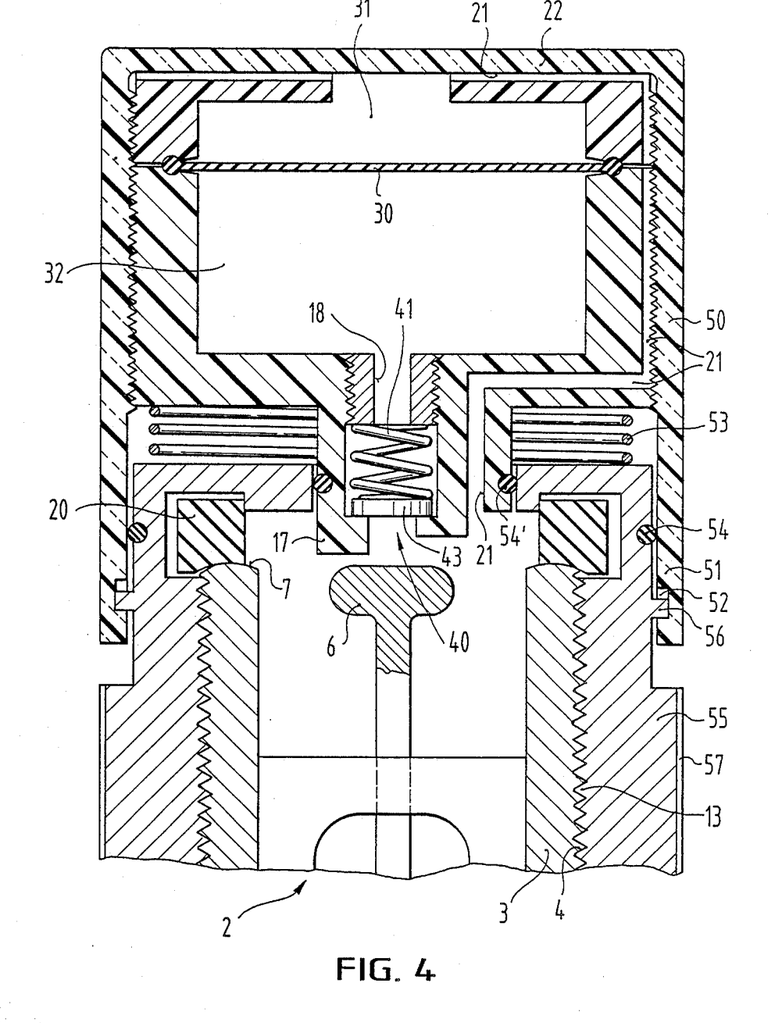
FIG. 4 is a schematic view of a fourth embodiment of a valve cap according to the invention, comprising a screw portion and an indicator portion movable relative thereto.

FIG. 4 illustrates a still further embodiment of a valve cap according to the invention. This embodiment differs from the preceding valve caps described with reference to the FIGS. 1, 2 and 3a, 3b by the provision of an indicator portion 50 disposed for movement relative to a screw portion 55. Purpose and function of the screw portion 55 correspond to those of the open housing end portion of the previously described embodiments. The screw portion 55 is threaded by means of an internal thread 13 onto the external thread 4 on the valve tube 3 of the tire valve 2. A sealing element 20 provides for hermetic sealing.

The indicator portion 50 substantially comprises a closed housing end portion 22 of transparent synthetic material. The housing interior is separated by a diaphragm 30 into a first chamber 31 and a second chamber 32 which via a port 18 permits fluid communication with the interior of the screw portion 55. A sealing member 40 is inserted in the port 18, which in the present case is a flap valve is biased towards the second chamber 32. A passageway 21 provides for permanent fluid communication with the first chamber 31. A cylindrical skirt 51 on the indicator portion 50 is in partial overlapping engagement with the screw portion 55. A protrusion 56 on the outer periphery of the screw portion 55 protrudes into a groove 52 recessed on the inner side of the cylindrical skirt 51. The groove 52 is a helical groove so that upon rotation of the indicator portion 50 relative to the screw portion 55 fixedly screwed home on the tire valve 2 the indicator portion 50 is able to perform a movement towards the screw portion 55—or away from the screw portion 55 in case of opposite rotation. A spring 53 accommodated within the cylindrical skirt 51 keeps the indicator portion 50 at a distance from the screw portion 55. Sealing means 54 and 54' provide for hermetic sealing between opposite sliding faces between indicator portion 50 and screw portion 55.

In use, the screw portion 55 is first screwed home on the valve sleeve 3 of a tire valve 2 until the end face 7 of the valve sleeve compresses the sealing element 20 so as to ensure hermetic sealing. Axially oriented knurling 57 on the outer periphery of the screw portion 55 facilitates the threading operation. Thereupon the indicator portion 50 is turned relative to the fixed screw portion 55 and is thereby moved towards the tire valve 2. The actuator 17, which is fixed to the indicator portion 50, depresses the rod 6 of the tire valve 2 and opens the same. Under the action of the tire pressure the flap 43 of the flap valve is lifted from its valve seat against the biasing force of the biasing element 41 so that the reference pressure, which corresponds to the tire pressure, can build up in the second chamber 32. Finally, the protrusion 56 on the screw portion 55 will latch in a predetermined latching position and will fix the indicator portion 50 relative to the screw portion 55 in this position in which the tire valve 2 is kept open.

However, such a fixed position in which the tire valve is permanently kept open is not necessarily required.

When in an embodiment according to FIG. 4 by adjustment of an indicator portion the tire valve has been opened, the reference pressure has been built up in the second chamber and said second chamber has been permanently sealed, the tire valve may be closed again by opposite adjustment and the indicator portion may be kept in its initial position under the action of a spring element. Due to the hermetically sealed state of the overall assembly, the initial tire pressure also prevails in the first chamber so that the diaphragm remains essentially unloaded. When it is desired at a later time to check whether the then actual tire pressure still corresponds to the desired tire pressure, the indicator portion is again moved and the tire valve opened. The actual tire pressure will act on the first chamber without changing the reference pressure in the second chamber, and a possibly visible deflection of the diaphragm will indicate a pressure drop if the actual tire pressure is lower than the desired tire pressure corresponding to the reference pressure in the second chamber.

As explained above, the invention has been described with reference to preferred embodiments thereof. It will be apparent to those skilled in the art that various changes and modifications of the described embodiments are possible without a deviation from the gist of the invention. Such changes and modifications shall also be covered by the subject matter of the instant invention insofar as they can be subsumed under the subject matter of the patent claims and equivalents thereof.

I claim:

1. A pressure drop indicating valve cap for a pneumatic tire equipped with a valve having a valve tube, the valve cap comprising:
    a housing including a wall, threaded means for mounting the housing to the valve tube, a closed end portion having a transparent section, and an open end portion, the housing wall and the closed end portion defining an interior of the housing;
    a sealing element for sealing the valve tube to the open end portion of the housing;
    an actuator for opening the tire valve;
    a deflectable indicator diaphragm which separates the housing interior into a first chamber adjacent to the transparent section of the closed end portion of the housing and a second chamber adjacent to the housing wall, said first chamber being in flow connection with the tire valve via at least one permanently open flow path recessed in the housing and said second chamber being in flow connection with the tire valve via a port in the housing wall; and
    sealing means for hermetically sealing said port whereby with the initial tire pressure being permanently maintained in the second chamber, a reduction of the actual tire pressure relative to the initial tire pressure causes the diaphragm to deflect closer to the transparent housing portion and become visible through said transparent section of the closed end portion of the housing.

2. The valve cap according to claim 1, wherein by screwing the valve cap on the valve tube of the tire valve, the sealing element is capable of being compressed by at least 1.5 to 2 mm.

3. The valve cap according to claim 1, wherein the sealing element is inserted in an annular cut-out of larger cross-sectional dimensions that the cross-section of the sealing element.

4. The valve cap according to claim 1, wherein screwing the valve cap on the tire valve tube causes the actuator to depress a plunger of the tire valve after the sealing element has provided a hermetic seal between tire valve tube and open housing end portion.

5. The valve cap according to claim 1, wherein the threaded means includes a screw portion for screwing onto the tire valve tube, wherein the valve cap further comprises an indicator portion movable relative to said screw portion, and wherein after hermetic sealing between the tire valve tube and the screw portion an adjustment of the indicator portion will depress a plunger of the tire valve.

6. The valve cap according to claim 1, wherein the sealing means permanently seals the second chamber after setting of the desired tire pressure in the first chamber and in the second chamber.

7. The valve cap according to claim 6, wherein the sealing means includes a shut-off member which is urged by a section of a tire valve tube end face against a transversely oriented housing wall to thereby permanently close the port.

8. The valve cap according to claim 6, wherein the sealing member means includes a resiliently retained shut-off member which is urged by a spring element against a housing wall portion to thereby permanently close the port.

9. The valve cap according to claim 8, wherein the port is formed in a housing wall portion which defines a second chamber and is parallel to a sidewall of the valve cap housing and wherein the spring element is a leaf spring which is oriented substantially in parallel to said housing wall portion.

10. The valve cap according to claim 8, wherein the spring element may be deflected against its inherent bias due to magnetic action during screwing the valve cap in the tire valve or thereafter and said deflection of the spring element causes a shut-off member to be separated from the port and effect a pressure balance between the second chamber and the first chamber or the open tire valve, respectively.

11. The valve cap according to claim 7, wherein the port comprises a valve seat configuration and wherein the shut-off member comprises a valve body portion being complementary with said valve seat configuration and being formed integrally with the shut-off member.

12. The valve cap according to claim 8, wherein the port comprises a valve seat configuration and wherein the shut-off member comprises a valve body portion being complementary with said valve seat configuration and being formed integrally with the shut-off member.

13. The valve cap according to claim 12, wherein the sealing means includes a tapering valve body which under the biasing action of the spring element is urged with its tip into a likewise tapering valve seat configuration.

14. The valve cap according to claim 6, wherein the sealing means includes a flap valve having its flap biased towards the tire valve.

15. The valve cap according to claim 14, wherein the bias of the flap valve is sufficiently large so that any tire pressure increase caused by an increase in temperature or use of the tire will not open the flap.

16. The valve cap according to claim 1, wherein at the closed transparent housing end portion a sight screen of opaque material is provided in which an aperture having a diameter of about 2 to 4 mm is left open and wherein the undeflected diaphragm is disposed at a distance of about 2 to 4 mm distant from said transparent aperture.

17. The valve cap according to claim 1, wherein the diaphragm material is coloured.

18. The valve cap according to claim 16, wherein the diaphragm material is coloured and wherein the colour of the diaphragm material is a signal or contrasting colour as compared to the colour of the sight screen material.

19. The valve cap according to claim 16, wherein a reduction of the desired tire pressure by 0.3 bar will cause a clearly visible deflection of the diaphragm towards the aperture.

20. The valve cap according to claim 19, wherein any reduction of the tire pressure by about 0.1 bar will cause an approximately linear deflection of the diaphragm by about 1 to 2 mm.

* * * * *